United States Patent [19]

Gallagher et al.

[11] Patent Number: 5,680,925
[45] Date of Patent: Oct. 28, 1997

[54] CONVEYOR BELT LIFT APPARATUS

[75] Inventors: Nelson Dale Gallagher, Fairview; Randall Reed McNeely, Barrackville, both of W. Va.

[73] Assignee: Eastern Associated Coal Corp., Charleston, W. Va.

[21] Appl. No.: 562,269

[22] Filed: Nov. 22, 1995

[51] Int. Cl.⁶ .................................................. B65G 21/12
[52] U.S. Cl. ............................................... 198/861.1
[58] Field of Search ........................... 198/735.1, 735.3, 198/860.1, 861.1

[56] References Cited

U.S. PATENT DOCUMENTS

| | | | |
|---|---|---|---|
| 4,007,827 | 2/1977 | Mattos | 198/861.1 |
| 4,513,859 | 4/1985 | Long et al. | 198/861.1 X |
| 4,736,835 | 4/1988 | Hinkle | 198/860.1 |
| 4,932,516 | 6/1990 | Andersson | 198/861.1 X |

FOREIGN PATENT DOCUMENTS 2207408  2/1989  United Kingdom ............... 198/861.1

*Primary Examiner*—James R. Bidwell
*Attorney, Agent, or Firm*—Senniger, Powers, Leavitt & Roedel

[57] ABSTRACT

Apparatus for use in repairing a conveyor system having a belt supported by a series of rollers mounted along a frame which supports the conveyor belt above the ground of a mining operation. The apparatus includes a belt support and at least one lifter connected to the belt support. The lifter operatively supports the belt support from the conveyor system frame and provides mechanical advantage in raising the belt support to lift at least one portion of the belt relative to the conveyor system, thereby separating the belt portion from at least one of the conveyor system rollers and freeing the roller.

19 Claims, 6 Drawing Sheets

CONVEYOR BELT LIFT APPARATUS

BACKGROUND OF THE INVENTION

This invention relates generally to apparatus for repairing a conveyor system, and more particularly to apparatus for separating a conveyor system belt from at least one conveyor system roller to free said roller for replacement or repair.

Conveyor systems are used throughout industry to transport product. Typically, these systems have one or more endless belts which travel in a circuit on a series rollers attached to a frame. The rollers support the belt and reduce friction, allowing the belt to be moved more easily. Over time, the rollers wear and the bearings between the rollers and frame deteriorate so that the rollers and/or bearings associated with the rollers need replacement. The belts are up to sixty inches wide or more and are many hundreds of feet long, making even a small section too heavy to lift manually. Further, the tension of the belts prevents the belts from being lifted manually. Because the weight and tension of the belt forces the roller downward, replacement is virtually impossible without first separating the belt from the particular roller to be replaced.

In the past workers have attached a winch to a roof bolt or roof strap in the ceiling of the mine and have lifted the belt with the winch to separate the belt from the roller. This method is cumbersome and could potentially cause the roof bolts to fail which is undesirable. In another prior method, the belt is lifted from the rollers with a lever and fulcrum. A long lever is desirable to increase the mechanical advantage, but the restricted area available in a mine prevents the use of long levers. When shorter levers are used, larger forces must be applied which may pose a risk of injury to the workers.

Summary of the Invention

Among the several objects of this invention may be noted the provision of apparatus capable of providing significant mechanical advantage for separating a conveyor belt from a roller; the provision of such apparatus which does not rely upon roof structures to support the conveyor belt; the provision of such apparatus which maintains the conveyor belt in a preferred shape; the provision of such apparatus sized for use in close environments such as underground mines; the provision of such apparatus which is relatively small and light weight for convenient transport; and the provision of such apparatus adapted to lift both a lower return reach and an upper transport reach of a conveyor system belt.

Apparatus of this invention is for use in repairing a conveyor system having a belt supported by a series of rollers mounted along a frame on the ground of a mining operation. Generally, the apparatus includes a belt support and at least one lifter connected to the belt support. The lifter supports the belt support from the ground of the mining operation and provides mechanical advantage in raising the belt support to lift at least one portion of the belt relative to the conveyor system, to separate the belt portion from at least one of the conveyor system rollers.

In another aspect of the invention, the apparatus includes first and second belt supports. The first support supports a portion of a transport reach of the belt and the second support simultaneously supports a portion a return reach of the belt. At least one lifter is connected to the first and second belt supports to provide mechanical advantage in raising the belt supports to lift the portions of the belt supported by the belt supports relative to the conveyor system and to separate the portions of the transport reach and return reach from corresponding conveyor system rollers.

In yet another aspect of the invention, the apparatus comprises a belt support and at least one lifter connected to the belt support for supporting the belt support from the ground of the mining operation and for providing mechanical advantage in raising the belt support. The belt support includes a pair of spaced apart segments extending at an angle from the belt support for engaging opposite side margins of the belt for retaining a generally concave configuration of the belt portion when separated from the system roller.

Other objects and features of this invention will be in part apparent and in part pointed out hereinafter.

BRIEF DESCRIPTION OF THE DRAWINGS

Corresponding parts are designated by corresponding reference characters throughout the several views of the drawings.

DETAILED DESCRIPTION OF THE PREFERRED EMBODIMENT

Figure 1:
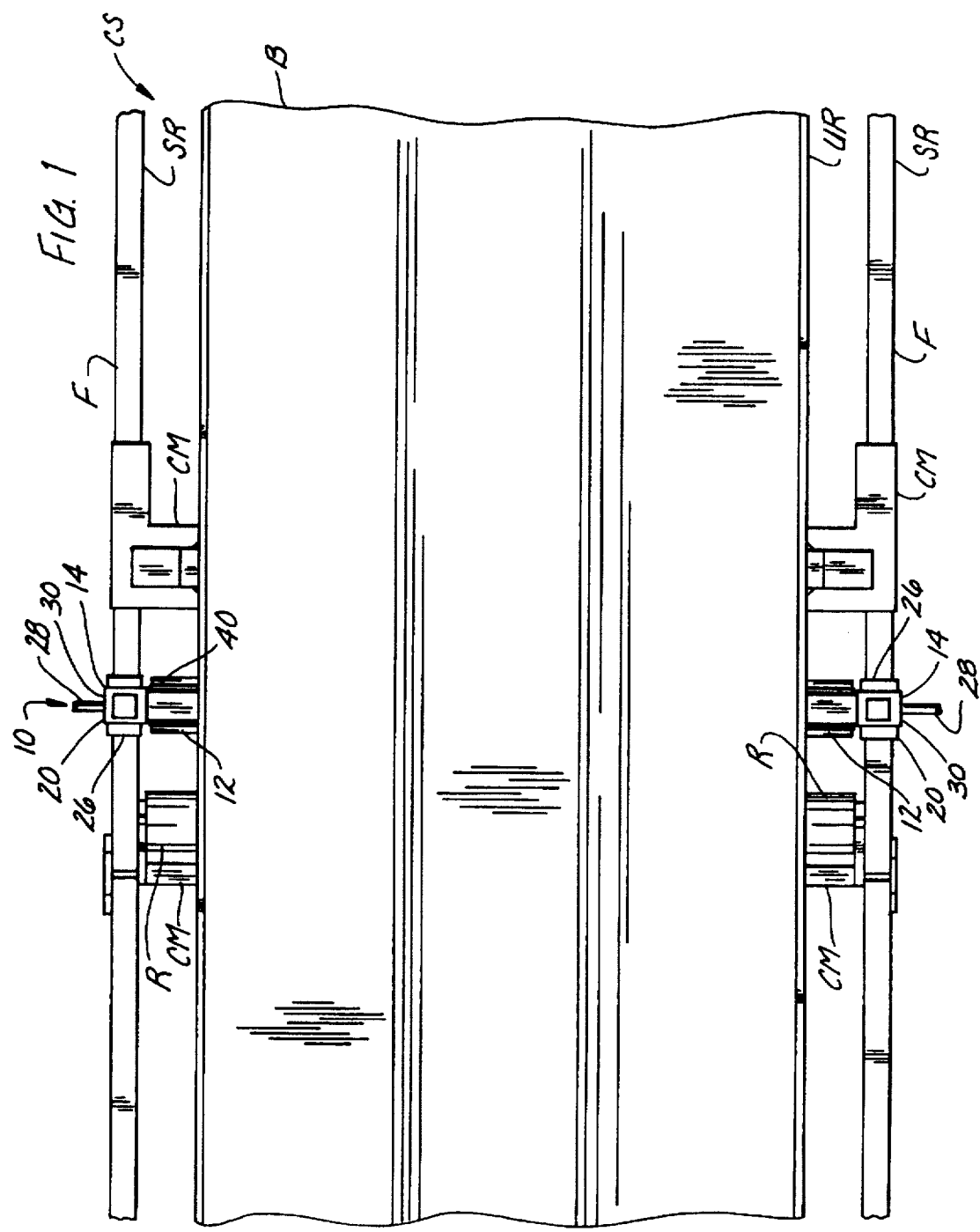
FIG. 1 is a fragmentary top plan of a conveyor system and apparatus of the present invention.
Figure 2:
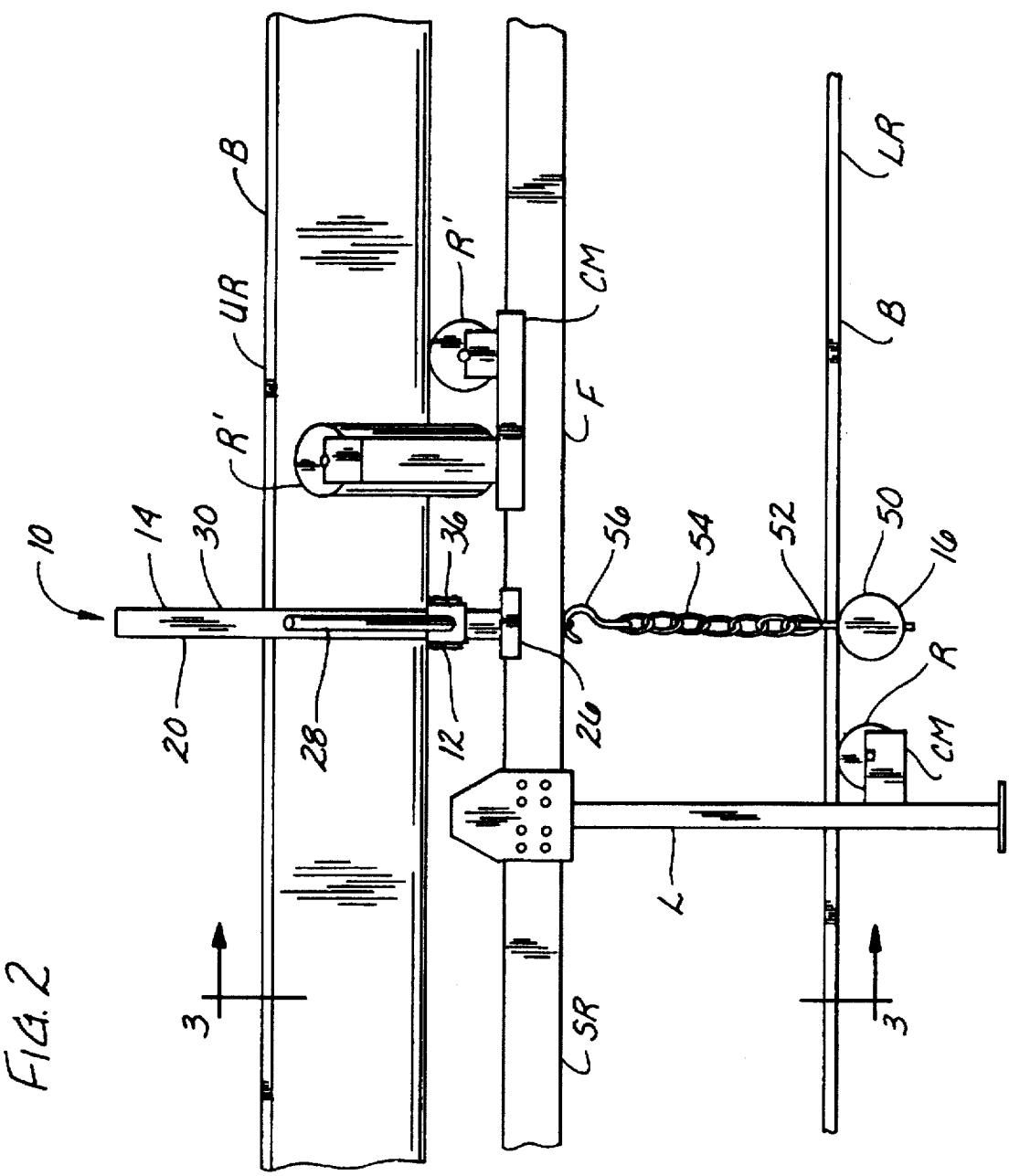
FIG. 2 is a side elevation of the conveyor system and apparatus of FIG. 1.
Figure 3:
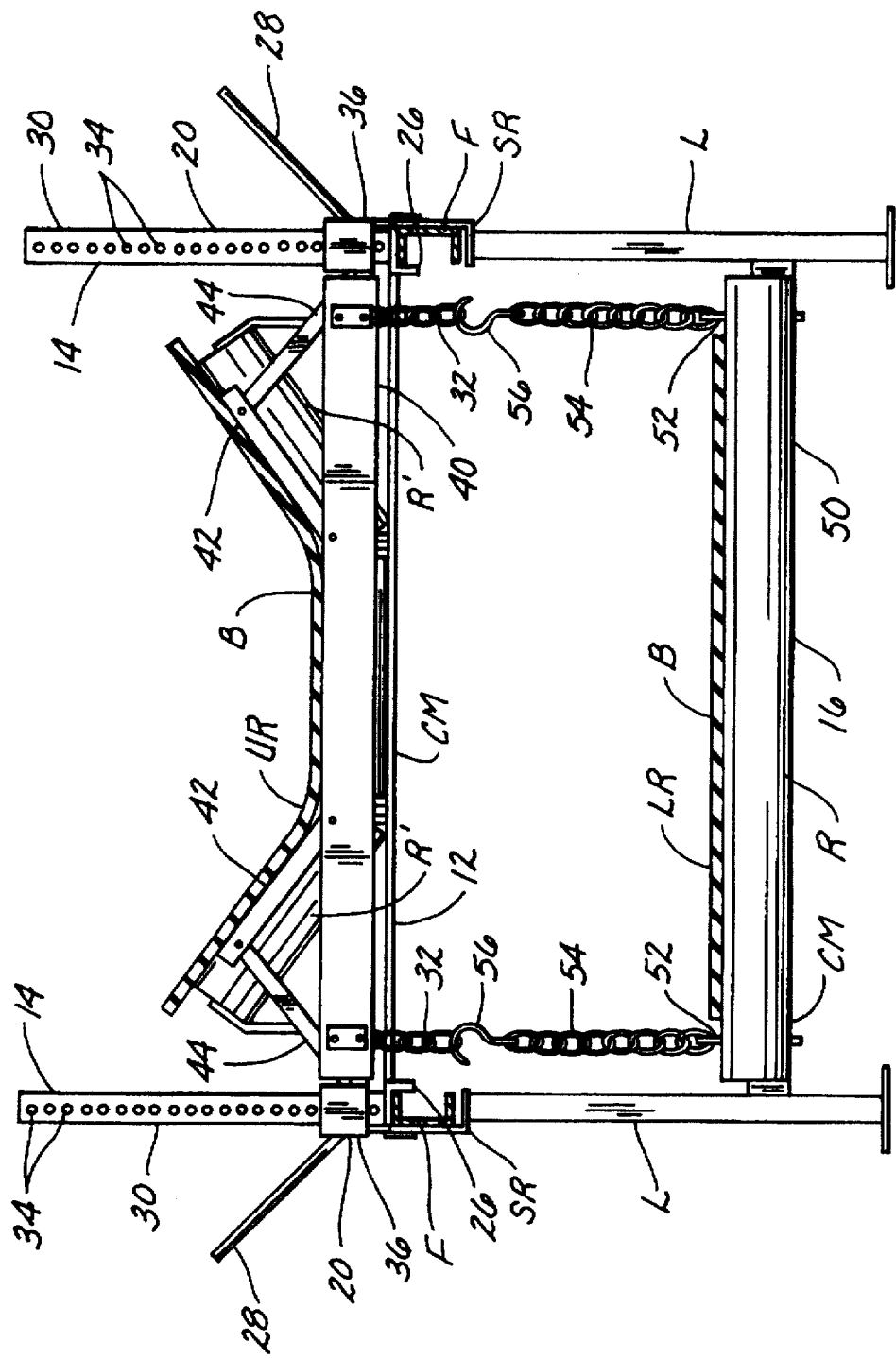
FIG. 3 is a cross section of the conveyor system and apparatus taken in the plane of line 3—3 of FIG. 2.

Referring now to the drawings, and first more particularly to FIGS. 1–3, conveyor belt lift apparatus incorporating the present invention is indicated in its entirety by the reference numeral 10. The apparatus 10 comprises an upper belt support 12 having a lifter 14 attached to each end and a lower belt support 16 suspended below the upper support. FIGS. 1–3 show the apparatus 10 installed on a conveyor system, indicated generally by reference letters CS, having an endless belt B supported by upper and lower rollers (designated R' and R, respectively) attached to a frame F by cross members CM. The endless belt B has an upper reach UR which moves in the direction of product transport and a lower reach LR which moves in an opposite direction. The upper reach UR is supported by the upper rollers R' and the lower reach LR is supported by the lower rollers R. Rollers R' mounted on opposite sides of the frame F and angling downwardly toward the center of the frame hold the upper reach UR so that it is shaped like a trough for holding loose material (e.g., coal) on the upper reach. The frame includes longitudinal side rails SR, and legs L depend from the side rails SR at intervals to support the side rails above the ground of the mining operation. Although the legs L are shown extending downward from the side rails SR, it will be understood that the legs may extend upward to support the conveyor system CS from the ceiling of an underground mining operation.

Figure 5:
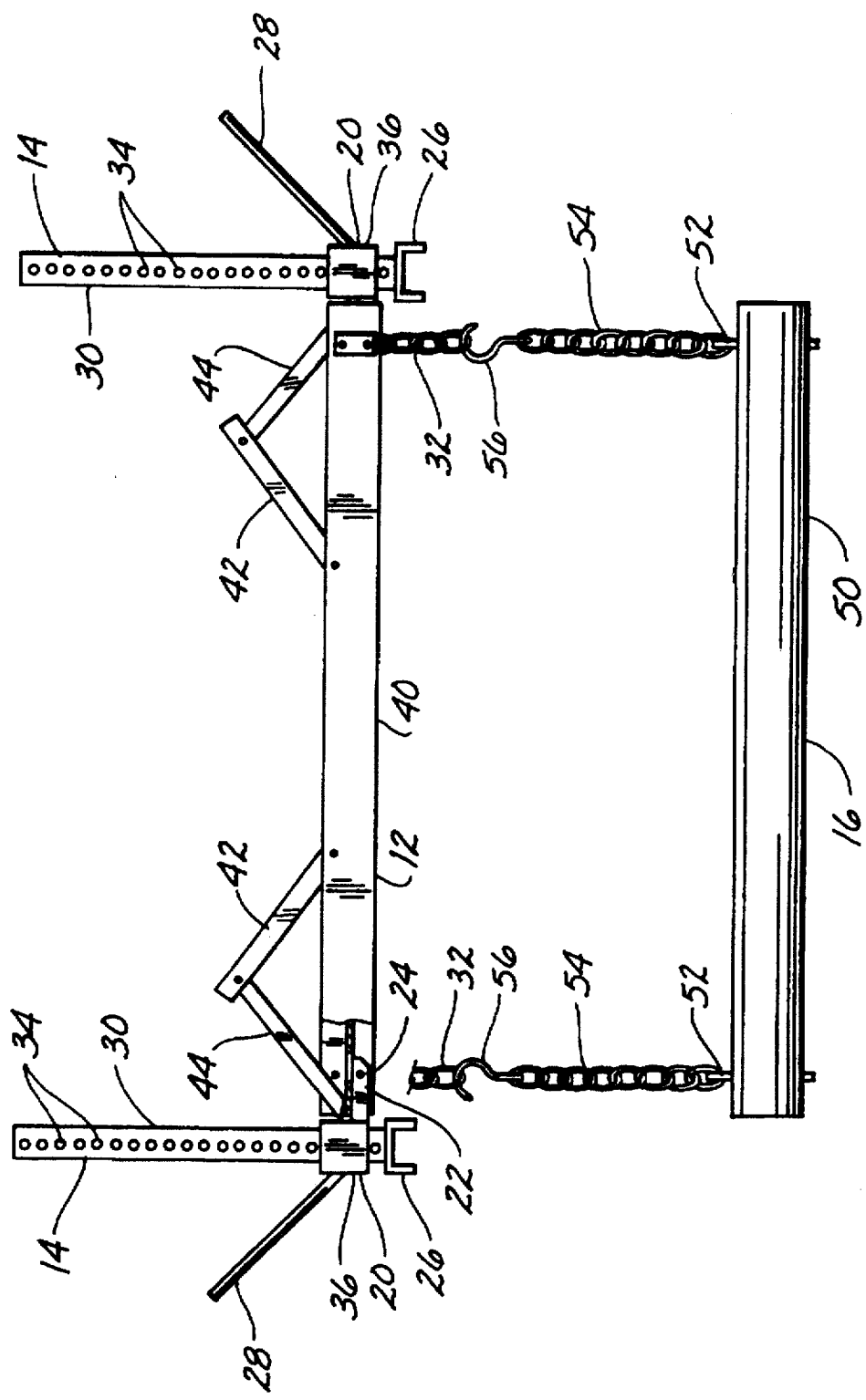
FIG. 5 is a front elevation of the apparatus shown assembled and in a lifting position.
Figure 6:
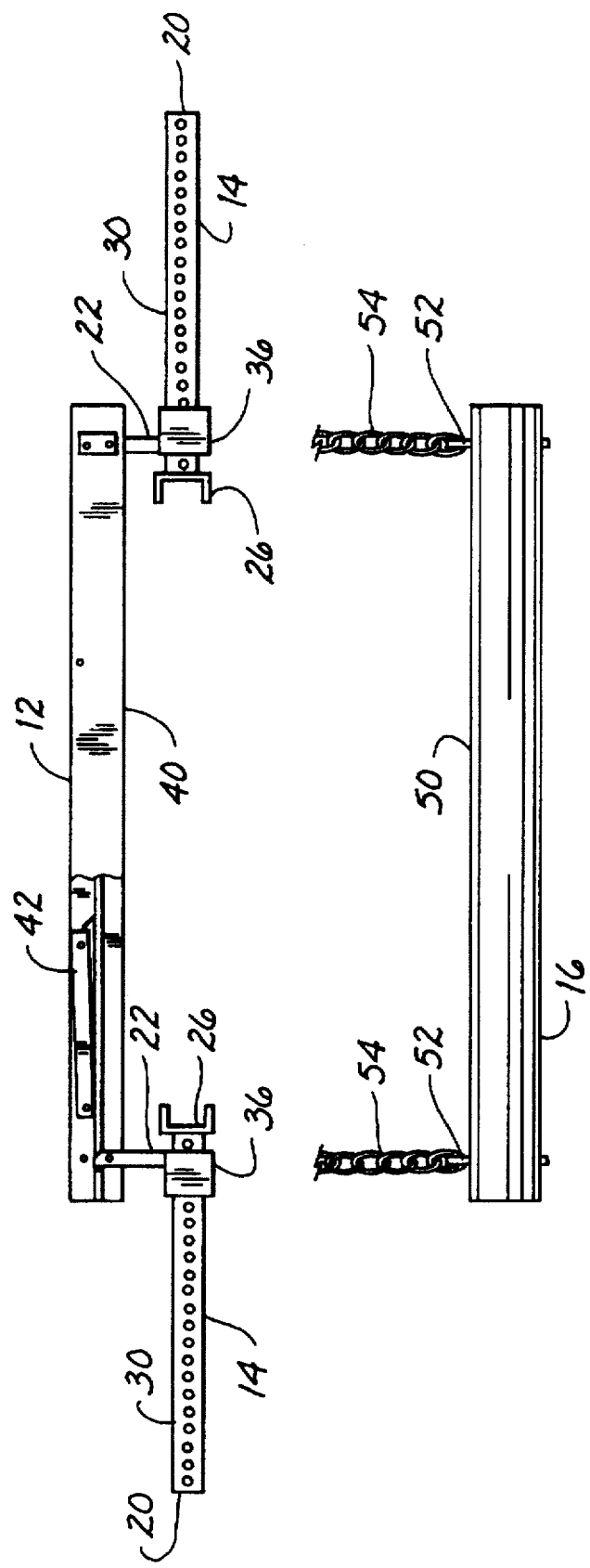
FIG. 6 is a front elevation of the apparatus shown disassembled and in a stowed position.

Each lifter 14 is a conventional rack-and-lever jack 20 having a tongue 22 pivotally connected to one end of the upper belt support 12 with a hinge pin 24 so that the jacks may be moved between deployed and stowed positions as shown in FIGS. 5 and 6, respectively. A mount 26 is attached as by welding to the lower end of each jack 20 to mount the jack to the side rails SR of the conveyor system frame F when the apparatus 10 is installed on the conveyor system CS. The mounts 26 are made from aluminum channel in the preferred embodiment. The mounts 26 have an inverted channel shape and receive the side rails SR of the frame for holding the apparatus 10 on the frame. The mounts 26 are free of fixed connection to the frame F for ease of installation and removal of the apparatus 10. However, the mounts 26 could be connected to the frame F, or support the apparatus directly from the ground, without departing from the scope of the present invention. As is well known, a jack handle 28 may be used to actuate the jack lever (not shown) to move the tongue 22 to different locations on the rack 30. The hinge pins 24 connecting the jack tongues 22 to each end of the upper support 12 also attach a short length of ¼ inch chain 32 to the upper support for connecting the lower support 16 to the upper support as will be explained in greater detail below. A series of holes 34 extend along each rack 30, and a jack housing 36 having a conventional internal mechanism and a tongue 22 surrounds each rack 30.

Figure 4:
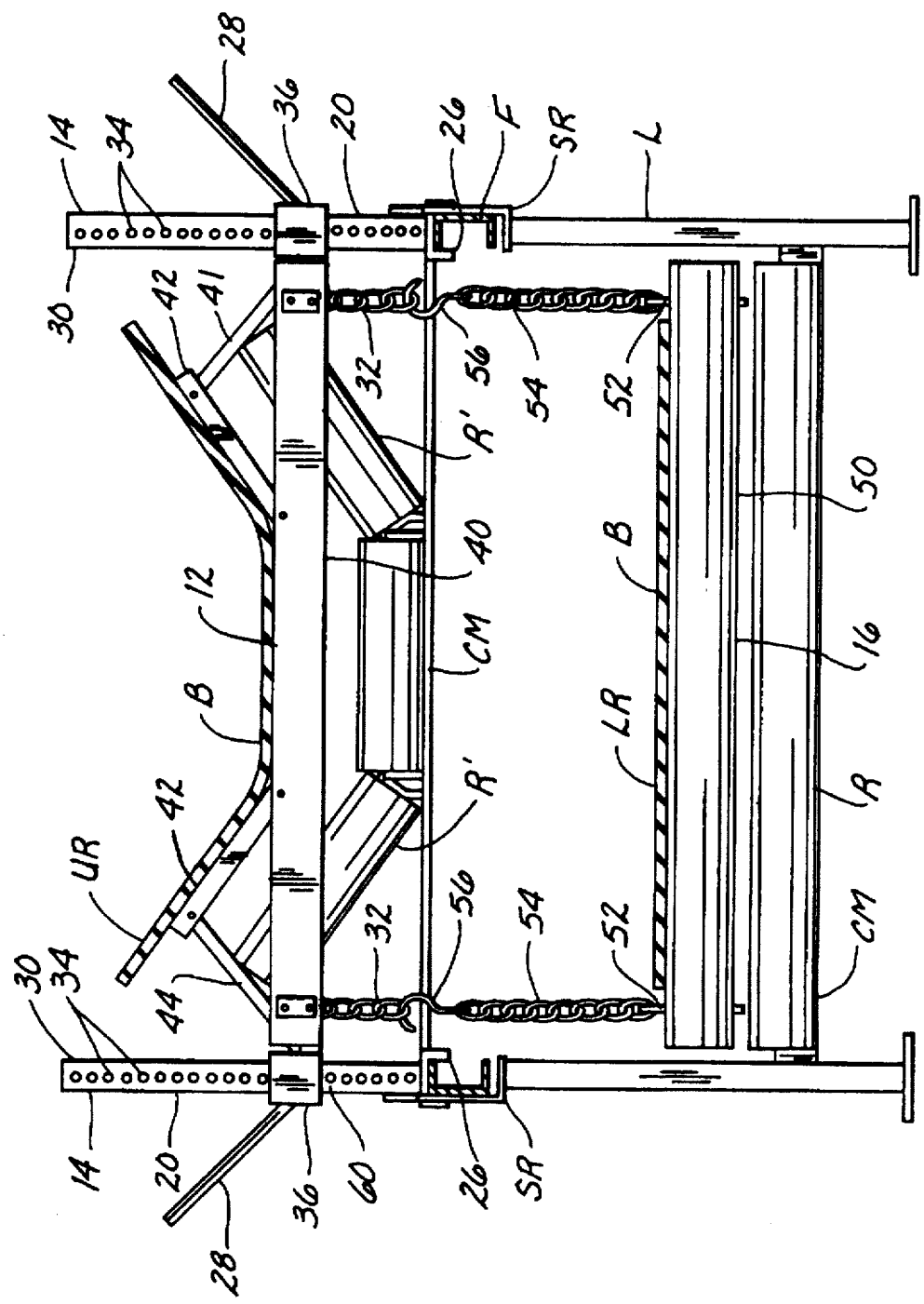
FIG. 4 is the cross section of FIG. 3, but showing the belt support in a raised position.

The upper belt support 12 comprises a four inch aluminum H-beam 40 having two belt support segments 42 pivotally attached to the H-beam. Each of the segments 42 is pivotable to a deployed position in which the segment is angled relative to the H-beam as shown in FIG. 5. Braces 44 support the segments 42 in the deployed position to maintain the concave configuration of the upper reach UR shown in FIGS. 3 and 4. The lower end of each brace 44 is positioned as shown in FIG. 3 so that it rests against the respective jack housing 36 to prevent the brace 44 from pivoting outward and to maintain the segment 42 in the deployed position. Each brace 44 is pivotally attached to an end of the corresponding segment 42 so that the braces may be pivoted inward and segments may be collapsed downward to a stowed position when not in use as shown in FIG. 6. In the preferred embodiment, the segments 42 and braces 44 are made of aluminum channel.

The lower belt support 16 is in the preferred embodiment a three inch diameter aluminum pipe 50 having an eye 52 fastened near each end. A length of ¼ inch chain 54 is attached to each eye 52 and a hook 56 is fastened to the opposite end of each chain. The hooks 56 may be inserted into a link of the chain 32 depending from the upper support 12 hinge pin 24 to releasably connect the lower support 16 to the apparatus 10. Thus configured, the apparatus 10 is used to separate the conveyor belt B from at least one of the rollers R', R under either the upper reach UR or the lower reach LR of the belt so that roller replacement or repair may be performed. Before beginning, the conveyor should be tagged with an appropriate warning and the power should be locked out to prevent the conveyor from being accidentally energized.

To lift the upper reach UR off of the supporting upper roller R', the upper support 12 is inserted between the upper reach and conveyor side rails SR adjacent the roller to be replaced. The support 12 is inserted on its side with the lifters 14 and segments 42 folded in their stowed positions as shown in FIG. 6. Once in position, the lifters 14, segments 42 and braces 44 are pivoted to their deployed positions shown in FIG. 5, and the apparatus 10 is turned upright to the position shown in FIG. 3. The apparatus 10 is positioned with the mounts 26 atop the conveyor system side rails SR and receiving portions of the side rails within them. The lower support 16 need not be attached to the upper support 12 if only an upper roller R' is being replaced. To separate the belt B from the roller R', the jack levers 28 are actuated at the same time by workers (not shown) on opposite sides of the conveyor system CS to ratchet the jack tongue 22 up the corresponding rack 30 thereby raising the upper support 12 relative to the conveyor frame F. Actuation continues until the roller R' turns freely, which generally indicates sufficient belt and roller separation. A stop pin 60 (FIG. 4) may be inserted in one or both holes 34 immediately below the jack housings 36 to prevent the jacks 20 from being inadvertently lowered. The freed roller R' is disconnected from the conveyor cross member CM and replaced or repaired. The belt B may then be lowered onto the newly replaced or repaired roller by removing the stop pin 60 from the hole 34 and actuating the jack levers 28 to lower the upper support 12. Once the apparatus 10 is removed from the conveyor by reversing the installation procedure, the conveyor system CS may be returned to service.

Replacement of a lower roller R is accomplished in much the same way as an upper roller R'. As with replacement of the upper rollers R', the upper support 12 is inserted between the upper reach UR and conveyor side rails SR adjacent the roller R to be replaced, with the lifters 14 and segments 42 in the stowed position. Then the lifters 14 are pivoted to their deployed positions and located over the conveyor system side rails SR. The segments 42 and braces 44 need not be deployed unless separation of the upper reach UR and an upper roller R' is also desired. Once the upper support 12 and lifters 14 are positioned as shown in FIGS. 1–3, the lower support 16 may be attached to the upper support 12 by securing the hooks 56 of the lower support to the chains 32 depending from the hinge pins 24 of the upper support 12. To separate the belt B from the lower roller R, the jack levers 28 are actuated to raise the lower support 16 relative to the conveyor frame F. Once the roller R turns freely, indicating belt and roller separation, stop pins 60 may be inserted in the holes 34 immediately below the housing 36 to prevent the jack 20 from being inadvertently lowered. The freed roller R may be disconnected from the conveyor system cross members CM and replaced or repaired before removing the stop pins 60 and actuating the jack levers 28 to lower the upper support 12. The apparatus 10 is removed from the conveyor by reversing the installation procedure, and the conveyor system CS is returned to service.

As alluded to above, in another method of use the upper and lower reaches may be separated simultaneously from corresponding rollers. To perform this other method, the upper support 12 is installed with the lifters 14, segments 42 and braces 44 deployed, and the lower support 16 is connected to the upper support. Then, the jack levers 28 are actuated to simultaneously raise both the upper and lower supports 12, 16 to separate the upper and lower reaches of the belt from the corresponding rollers R', R. Once the rollers are free, stop pins 60 may be installed before making the repair or replacement. After the repair is made, the apparatus 10 is removed by reversing the installation and lifting procedure, and the conveyor system CS is returned to service.

Numerous alternate embodiments of the previously described apparatus are envisioned without departing from the scope of the present invention. For instance, the jacks may be attached directly to the lower support rather than to the upper support to provide an apparatus dedicated to separating the lower reaches of conveyor belts from the rollers. Other types of lifters including screw jacks and hydraulic jacks may also be used in place of or in combination with the rack-and-lever jacks of the preferred embodiment without departing from the scope of this invention. It is envisioned that a single jack might be used in place of the two jacks. Further, different jack spacing and mounts other than the channel members may used to improve the performance of the apparatus with different conveyor systems.

The previously described apparatus 10 provides several advantages over conventional conveyor belt lifts. Because two rack-and-lever jacks 20 are present, significant mechanical advantage is obtained for separating the belt B from the rollers R',R. Thus, the effort required of workers to replace a roller is reduced. The apparatus 10 is compact so that it may be used in close environments such as underground mines. The small and light-weight design makes transport to the work site convenient. Moreover, the apparatus of the present invention does not rely upon roof structure to support the conveyor belt B, thereby eliminating the potential for damaging the roof structure and permitting use of the apparatus in locations where such a structure is not present. Further, each of these advantages promotes a safer and quicker replacement of the conveyor system rollers as compared to previous methods.

In addition to being safer and quicker, the apparatus of the preferred embodiment is convenient in that it maintains the conveyor belt B in a preferred shape thereby permitting roller replacement without spilling product from the concave upper reach UR. Lastly, providing separable upper and lower supports 12, 16 enables a worker to avoid transporting and installing the lower support if it is not required for the particular job being performed.

While the present invention has been described by reference to a specific embodiment, it should be understood that modifications and variations of the invention may be constructed without departing from the scope of the invention defined in the following claims.

What is claimed is:

1. Apparatus for use in repairing a conveyor system having a belt supported by a series of rollers mounted along a frame, said frame supporting said conveyor belt above the ground of a mining operation, the apparatus comprising:

a belt support constructed for engaging and supporting the conveyor belt; and at least one lifter connected to the belt support and adapted to operatively support the belt support from the conveyor system frame, the lifter being constructed to provide mechanical advantage in raising the belt support to lift at least one portion of the belt relative to the conveyor system, thereby separating said one belt portion from at least one of the conveyor system rollers.

2. Apparatus as set forth in claim 1 wherein said lifter comprises a mount for mounting the lifter on the conveyor system frame.

3. Apparatus as set forth in claim 2 wherein said mount comprises a channel member sized and arranged to receive and retain therein a portion of the conveyor system frame.

4. Apparatus as set forth in claim 3 wherein the lifter further comprises a jack mounted on said channel member and projecting upwardly from said channel member, the jack supporting the belt support.

5. Apparatus as set forth in claim 4 wherein the jack includes a stop selectively engageable with the jack to fixedly hold the belt support at a predetermined height.

6. Apparatus as set forth in claim 4 wherein the belt support comprises a pair of spaced apart segments adapted to extend at an angle from the belt support for engaging opposite side margins of the belt for retaining a generally concave configuration of said one belt portion when separated from said at least one system roller.

7. Apparatus as set forth in claim 6 wherein the segments are each movable relative to the belt support between a deployed position and a stowed position.

8. Apparatus as set forth in claim 6 further comprising another belt support adapted to raise a second portion of the belt as the belt support lifts said belt portion.

9. Apparatus as set forth in claim 8 wherein said other belt support is adapted for releasable attachment to the apparatus whereby the apparatus is selectively operable without the other belt support.

10. Apparatus as set forth in claim 1 wherein the lifter comprises at least one jack moveable relative to the belt support between a lifting position and a stowed position.

11. Apparatus as set forth in claim 1 wherein the lifter comprises two jacks, one mounted on each end of the belt support.

12. Apparatus for use in repairing a conveyor system having a belt supported by conveyor system rollers including an upper and lower series of rollers mounted along a frame, said belt including a transport reach traveling in a first direction and a return reach traveling in a second direction opposite the first direction, the transport reach being supported by the upper series of rollers and the return reach being supported by the lower series of rollers, the apparatus comprising:

first and second belt supports, the first belt support being adapted to support a portion of the transport reach of the belt and the second belt support being adapted to simultaneously support a portion the return reach;

at least one lifter operatively connected to the first and second belt supports, the lifter being constructed to provide mechanical advantage in raising the belt supports to lift the portions of the belt supported by the belt supports relative to the conveyor system, thereby separating the portions of the transport reach and return reach from corresponding conveyor system rollers.

13. Apparatus as set forth in claim 12 wherein the second belt support is adapted for releasable attachment to the first belt support whereby the apparatus is selectively operable without the second belt support.

14. Apparatus as set forth in claim 13 wherein said lifter comprises a mount for mounting the lifter on the conveyor system frame.

15. Apparatus as set forth in claim 13 wherein the first belt support comprises a pair of spaced apart segments adapted to extend at an angle from the belt support for engaging opposite side margins of the transport reach portion for retaining a generally concave configuration of the transport reach portion when separated from at least one of the upper series of rollers.

16. Apparatus for use in repairing a conveyor system having a belt supported by a series of rollers mounted along a frame, the apparatus comprising:

a belt support; and at least one lifter connected to the belt support and adapted to operatively support the belt support, the lifter being constructed to provide mechanical advantage in raising the belt support to lift at least one portion of the belt relative to the conveyor system, thereby separating said one belt portion from at least one of the conveyor system rollers;

the belt support including a pair of spaced apart segments adapted to extend at an angle from the belt support for engaging opposite side margins of the belt for retaining a generally concave configuration of said one belt portion separated from said at least one system roller.

17. Apparatus as set forth in claim 16 wherein the segments are each movable relative to the body support between a deployed position and a stowed position.

18. Apparatus as set forth in claim 17 wherein said lifter comprises a mount for mounting the lifter on the conveyor system frame.

19. Apparatus as set forth in claim 17 further comprising another belt support adapted to raise a second portion of the belt as the belt support lifts said one belt portion.

* * * * *